United States Patent

Yamagata

[11] Patent Number: 6,002,939
[45] Date of Patent: *Dec. 14, 1999

[54] APPARATUS AND METHOD FOR ALLOCATING CHANNELS IN PLURAL COMMUNICATION UNITS

[75] Inventor: Masato Yamagata, Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/561,858

[22] Filed: Nov. 22, 1995

[30] Foreign Application Priority Data

Nov. 29, 1994 [JP] Japan .................................. 6-319245

[51] Int. Cl.⁶ .................................................. H04Q 7/20
[52] U.S. Cl. ......................... 455/464; 455/462; 455/426; 455/450
[58] Field of Search ................................ 379/58, 61, 62, 379/63; 455/34.1, 34.2, 54.1, 54.2, 166.1, 166.2, 179.1, 426, 450–452, 462, 464, 509, 511–514, 566

[56] References Cited

U.S. PATENT DOCUMENTS

| | | | |
|---|---|---|---|
| Re. 32,789 | 11/1988 | Lynk, Jr. et al. ........................ | 455/566 |
| 4,771,448 | 9/1988 | Koohgoli et al. ........................ | 455/450 |
| 4,894,856 | 1/1990 | Nakanishi et al. .................. | 455/34.2 X |
| 4,977,612 | 12/1990 | Wilson ................................ | 455/166.1 |
| 5,044,010 | 8/1991 | Frenkiel et al. ........................ | 455/464 |
| 5,237,603 | 8/1993 | Yamagata et al. ........................ | 379/61 |
| 5,355,516 | 10/1994 | Herold et al. ............................ | 455/450 |
| 5,418,839 | 5/1995 | Knuth et al. ............................... | 379/61 |
| 5,428,669 | 6/1995 | McCarthy ................................ | 455/464 |
| 5,450,611 | 9/1995 | Bonvallet et al. ..................... | 455/34.1 |
| 5,570,349 | 10/1996 | Bustamante et al. .............. | 455/54.1 X |
| 5,579,370 | 11/1996 | Fukushima et al. ..................... | 455/412 |
| 5,768,345 | 6/1998 | Takebe et al. .......................... | 455/464 |

*Primary Examiner*—Dwayne D. Bost
*Assistant Examiner*—Nay A. Maung
*Attorney, Agent, or Firm*—Jay H. Maioli

[57] ABSTRACT

A cordless telephone with no control channels which makes connection possible even when the handset or the base unit is within the area of another cordless telephone. When effecting connection between the handset and base unit through a pair of communication channels, connection request data is transmitted from one to the other of the handset and base unit by using one of a pair of communication channels paired with the other which is available as seen from the transmitting side. From the other side, on which the communication request data is received, data indicating whether the communication channel through which the connection request data has been transmitted is busy or not is sent. The transmission of connection request data is repeated through different communication channels until the data sent back indicates an available channel. When the data sent back indicates an available channel, connection is effected from then on between the handset and base unit through this available pair of channels.

6 Claims, 3 Drawing Sheets

APPARATUS AND METHOD FOR ALLOCATING CHANNELS IN PLURAL COMMUNICATION UNITS

BACKGROUND OF THE INVENTION

1. Field of the Invention

This invention relates to a method for allocating channels when effecting connection in a cordless telephone.

2. Description of the Related Art

In the United States, 10 communication channels for communication are authorized for use in the cordless telephone by the FCC (the Federal Communications Commission). However, as the penetration into general usage of the cordless telephone increases, a shortage of communication channels has become a problem. In view of this, another 15 channels are scheduled to be added to the 10 channels mentioned above, which means 25 channels in total are due for use in the near future.

Every one of these channels is duplex, with up and down channels paired with each other.

As in the case of the extremely-low-power system adopted in Japan, the cordless telephone system in the United States is provided with no control channels; it only has communication channels, with the result that problems can be generated at the time of calling out from the handset.

Suppose, for example, a base unit B1 and a handset H1, which is associated therewith, are connected to each other by using a third channel, as shown in FIG. 3.

Further, suppose, at this time, the reachable area of the down-channel radio wave transmitted from the base unit B1 is AB1, which, as indicated by the solid line, is a substantially circular area, with the base unit B1 at the center thereof. The handset H1 is situated within this area AB1. Further, suppose the reachable area of the up-channel radio wave transmitted from the handset H1 is AH1. This area AH1, indicated by the broken line, is a substantially circular area, with the handset H1 at the center thereof. The base unit B1 is situated within this area AH1.

Further, suppose another base unit B2 is situated outside the reachable area AB1 of the radio wave of the base unit B1 and within the reachable area AH1 of the radio wave of the handset H1. Suppose, further, a handset H2, associated with the base unit B2, is situated outside the areas AB1 and AH1. Actually, however, the base units B1 and B2 are fixed stations, which means they are situated from the beginning at the positions shown in the drawing, with the handsets H1 and H2 having moved to their positions shown.

In this condition, suppose the handset H2 has sent a call-out request (request for connection) to the base unit B2 through the third up-channel. When seen from the handset H2, the third third up-channel paired with the down-channel is an available channel.

However, when seen from the base unit E-2, the third up-channel is busy, so that it cannot be used for communication according to the rules laid down by the FCC. Thus, the base unit B2 cannot open an up-channel for communication with the handset H2.

Similarly, when the base unit sends a call-in request to the handset, the down-channel may be busy when seen from the handset although the up-channel is available when seen from the base unit. In this case also, it is impossible, under the circumstances, to open a communication channel.

SUMMARY OF THE INVENTION

This invention has been made with a view toward solving the above problem.

In accordance with the present invention, there is provided a cordless telephone in which connection is effected for communication between a handset 1 and a base unit 2 by using one pair of a plurality of pairs of communication channels, wherein, when effecting connection between the handset 1 and the base unit and 2 through a pair of communication channels, connection request data REQ is transmitted from one to the other of the handset and the base unit by using one of a pair of communication channels paired with the other which is available as seen from the side from which the connection request data REQ is to be transmitted;

data indicating whether the communication channel through which the connection request data REQ has been transmitted is busy or not is sent from the receiving to the transmitting side of the connection request data REQ through a communication channel which is paired with the one through which the connection request data has been transmitted;

the transmission of connection request data REQ is repeated through different communication channels until the data sent from the receiving side of connection request data REQ indicates an available communication channel; and when data indicating an available communication channel is received on the transmitting side of communication request data REQ, connection is effected between the handset and the base unit through this available channel.

When the channel used for transmitting the connection request is being used by another cordless telephone, the party requesting connection is informed of the situation, and search is made for an available channel through which connection is to be achieved between the base unit and handset.

DETAILED DESCRIPTION OF THE PREFERRED EMBODIMENT

Figure 1:
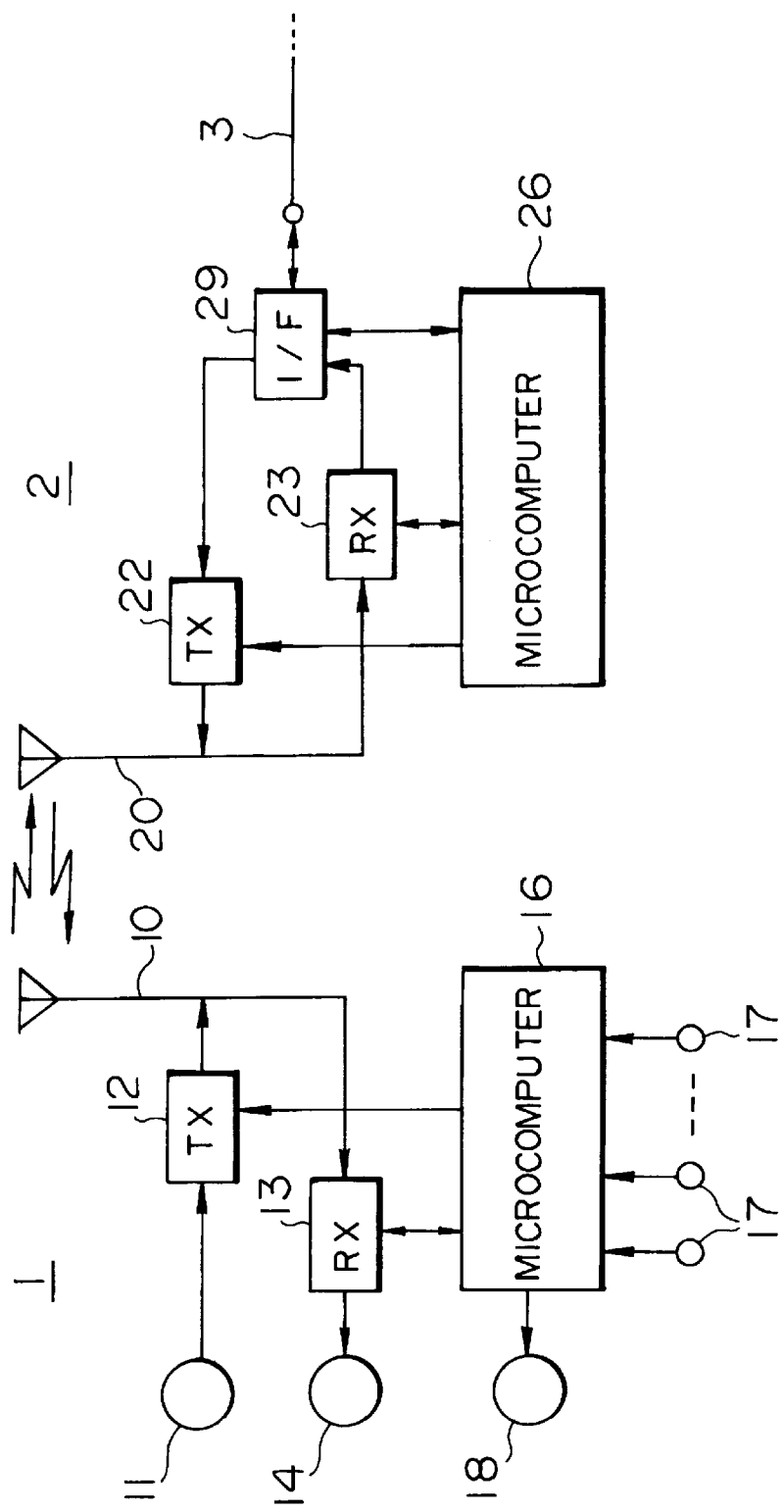
FIG. 1 is a block diagram illustrating the system configuration of a cordless telephone according to an embodiment of the present invention.

In FIG. 1, a handset 1 of a cordless telephone is connected through a radio channel to a base unit 2, which is connected to a telephone line (an outside line). In the handset 1, a transmission circuit 12 converts sound signals and various items of data, supplied from a telephone transmitter 11, to up-channel FM signals before transmitting them. A reception circuit 13 receives down-channel FM signals to extract therefrom sound signals and various items of data transmitted from the other party. The extracted sound signals are emitted through a telephone receiver 14.

Figure 2:
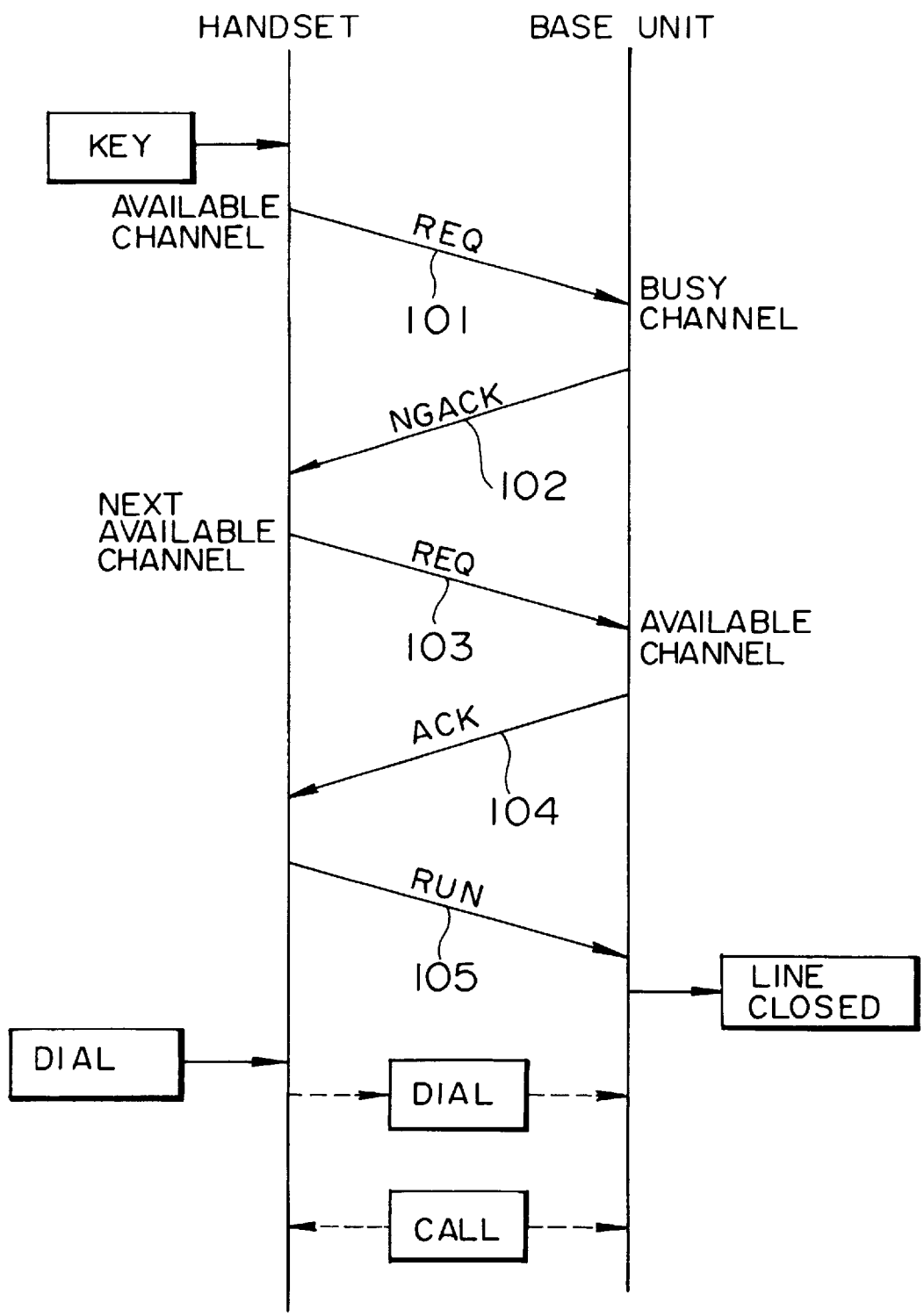
FIG. 2 is a sequence chart illustrating an example of the connection procedures according to the present invention.

A microcomputer 16 for system control is connected to various operating keys 17 and to a ringer 18 for indicating call-in. In this example, the microcomputer 16 has a ROM to which, for example, the processing program of a call-out sequence 100, shown in FIG. 2, is written as a part of the programs to be executed by the CPU thereof. Various kinds of data are accessed with respect to the transmission circuit 12 and the reception circuit 13 by the microcomputer 16, and their operation is controlled by this microcomputer.

The base unit 2 has a construction similar to that of the handset 1. In the base unit 2, a an up-channel transmission circuit 22, a down-channel reception circuit 23, a microcomputer for system control 26, and a line interface circuit 29 are mutually connected.

In this example, the microcomputer 26 has a ROM to which, for example, the processing program of a calling sequence 100 is written as a part of the programs to be executed by the CPU thereof. The interface circuit 29 has a four-wire/two-wire conversion circuit, a switching circuit for opening/acquisition of the line 3, a detection circuit for detecting a ringer signal when there is call-in, etc., and is connected to a microcomputer 26.

Through the processes executed in the microcomputers 16 and 26, the cordless telephone operates as follows:

[When a Call is Made from the Handset 1]

When an outside call is made by using the handset 1, a sound signal from the transmitter 11 is supplied to the transmission circuit 12 and converted to an up-channel FM signal, which is transmitted from an antenna 10 to the base unit 2.

In the base unit 2, the FM signal transmitted from the handset 1 is received by an antenna 20 and supplied to the reception circuit 23, out of which the sound signal from the handset 1 is taken, the sound signal being transmitted to the line 3 through the interface circuit 29.

Similarly, a sound signal from the other party is supplied to the transmission circuit 22 through the interface circuit 29 and converted to an up-channel FM signal, which is transmitted from an antenna 20 to the handset 1. In the handset 1, the FM signal transmitted from the base unit 2 is received by the antenna 10 and supplied to the reception circuit 13, out of which the sound signal from the other party is taken, the sound signal being supplied to the receiver 14. In this way, an outside call can be effected by using the handset 1.

[Operation in the Waiting State]

In the handset 1, the following operations are repeated:

(1) Monitoring of a call-in request from the base unit 2 in the "last channel" (the down-channel used in the previous communication);

(2) Monitoring of a call-in request from the base unit 2 in the "initial channel" (a fixed (down-channel that is set beforehand); and (3) Keeping OFF the power for all the circuits except that for the microcomputer 16 for, for example, two seconds, and putting the microcomputer 16 in a low-consumption mode.

In the base unit 2, the following operations are conducted:

(1) Monitoring of a call-out request from the handset 1 in an up-channel; and (2) Successively and repeatedly executing the processes of (1) in all the 25 up-channels.

The results of these operations are stored in the RAM of the microcomputer 26, which is designed to always retain the latest information regarding busy and available up-channels as seen from the base unit 2.

In this way, a waiting state for the handset 1 and the base unit 2 is established.

[Calling Out from the Handset 1 to an Outside Line]

This is realized through the execution of the call-out sequence 100 by the microcomputers 16 and 26.

When the handset 1 and the base unit 2 are in the waiting state, a talk key of the operating keys 17 of the handset 1 is depressed. As a result, the microcomputer 16 temporarily permits the transmission circuit 12 to perform transmission and, at the same time, form data REQ, which indicates the identification code of the handset 1 and a call-out request, the data REQ being supplied to the transmission circuit 12. As shown in step 101 of the sequence 100 shown in FIG. 2, the data REQ is transmitted from the handset 1 to the base unit 2.

The transmission channel (the up-channel which is paired with down channel) to be used for the transmission, as seen from the handset 1, is determined as follows:

(1) The last up-channel is used ashen the last down-channel is available.

(2) When the last down-channel is busy and the initial down-channel is available, the latter up-channel is used.

(3) When both the last down-channel and the initial down-channel are busy, the other down-channels are checked one by one until an available down channel is found, and the available up-channel which is paired thus found is used.

When the data REQ is transmitted in step 101, the base unit 2, which monitors all the up-channels one by one, receives the data REQ from the handset 1 through one of these up-channels.

Figure 3:
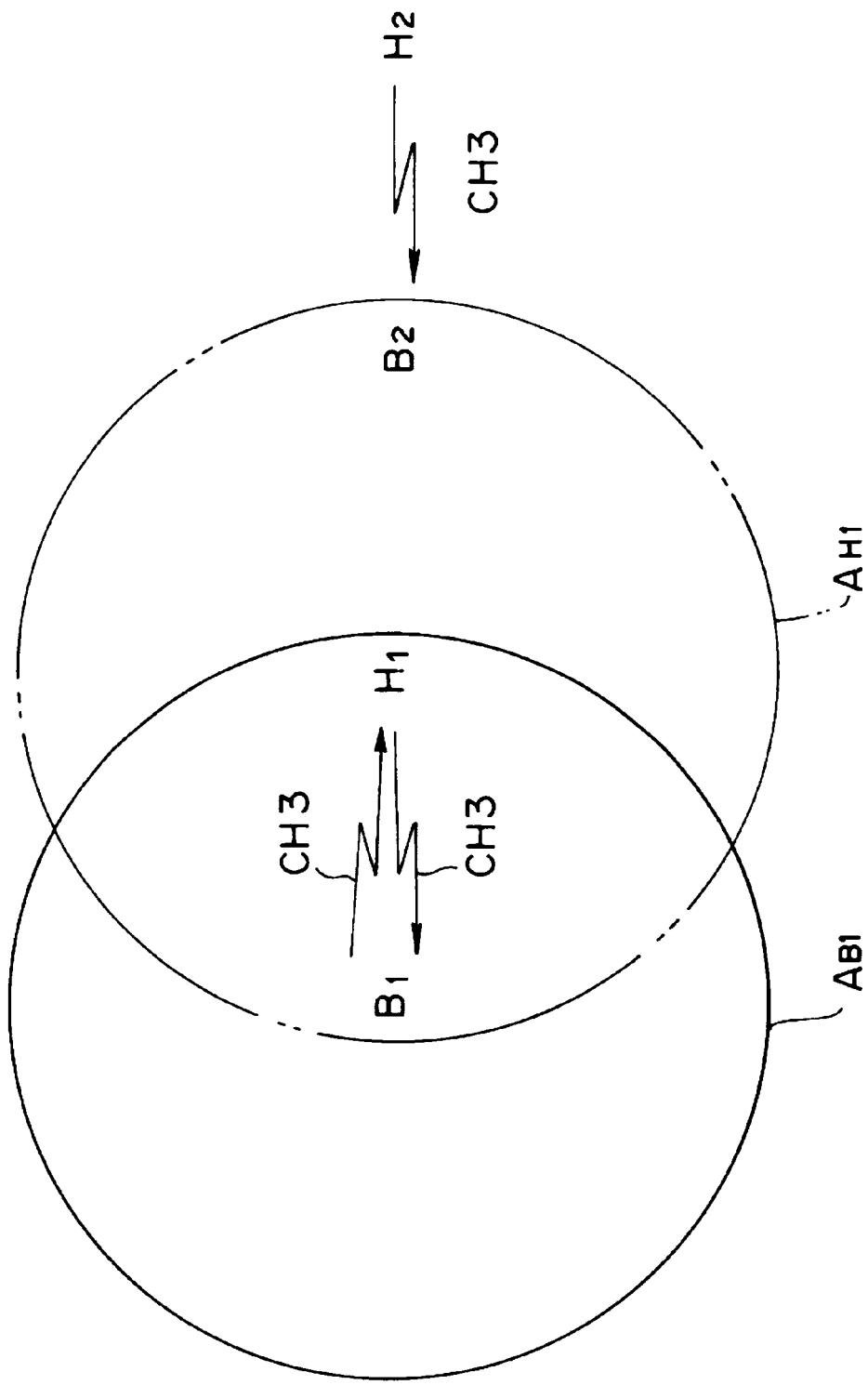
FIG. 3 is a diagram for illustrating a positional relationship between a plurality of pairs of base units and handsets.

In some cases, the handset 1 and the base unit 2 may be in a positional relationship corresponding to that of the handset H2 and the base unit B2 of FIG. 3. In such cases, it can happen that the up-channel used for the transmission by the handset 1 is being used by another cordless telephone which is in the vicinity of the base unit 2 (like the handset H1 and base unit B1 in the FIG. 3). However, even in such a case, it is possible for the base unit 2 to know the contents of the data REQ since the transmitted signal is an FM signal with contents in the form of a digital data REQ.

When (as in the case of the handset H2 and the base unit B2 of FIG. 3), the up-channel used for transmission by the handset 1 is being used by another cordless telephone near the base unit 2, the base unit 2 is notified of the situation through the processing in the waiting state.

Thus, in this case, the microcomputer 26 permits the transmission circuit 22 to effect transmission by the microcomputer 26, and the transmission channel (the down-channel) used in this case is the one paired with the up-channel used for transmission by the handset 1.

Further, the microcomputer 26 forms data NGACK shown in FIG. 2, which indicates the identification code of the base unit 2 and the fact that the channel used for transmission by the handset 1 is being used, the data NGACK being supplied to the transmission circuit 22. Thus, as shown in step 102 of the sequence 100, the data NGACK is transmitted from the base unit 2 to the handset 1.

In this case, the down-channel used for transmission by the base unit 2 is a channel which is already being used by some other nearby cordless telephone. However, this leads to no problem since, according to the rules of the FCC, transmission through a channel being used by another cordless telephone is authorized if it is a sort of burst transmission of short duration. Further, to the handset 1, that down-channel is available from the beginning.

When the handset 1 receives the data NGACK in step 102, it is found that the up-channel used in step 101 cannot be used. Thus, the transmission channel (the up-channel) is changed to the next available channel which is paired with the next available down-channel as seen from the handset 1, for example, to the initial up-channel, and, as indicated in step 103, data REQ is transmitted again by using this new up-channel.

When the base unit 2 receives the data REQ in step 103, a processing similar to that in step 101 is conducted, and, if the up-channel is also busy as seen from the base unit 2, a processing similar to that of step 102 is executed.

In this way, the processes of steps 101 and 102 are repeated until the up-channel through which the data REQ has been transmitted from the handset 1 is indicated as an available up-channel as seen from the base unit 2.

In the present example, if the up-channel through which the transmission in step 103 has been effected is available as seen from the base unit 2 also, call-out-response data ACK for permitting connection in that channel is formed in the microcomputer 26. Then, this data ACK is transmitted, as shown in step 104, to the handset 1 through the down-channel paired with the up-channel used in step 103.

When the handset 1 receives this data ACK, data RUN indicating that processing is to be executed through that channel from then on is formed, and this data RUN is transmitted through the same up-channel as that used in step 103.

When the base unit 2 receives this data RUN, operations, such as the closing of the line 3, are executed, and the handset 1 and the base unit 2 are connected together through the pair of channels used in steps 103 through 105, and, further, the base unit 2 is connected to the line 3.

Thus, from this time onward, when the telephone number of the other party is input from the handset 1, data on the telephone number is transmitted to the base unit 2 through the channel used for the connection and, further, a dial signal is sent out from the base unit 2 to the line 3. Then, when the other party answers the telephone call, conversation is possible as described above.

[Call-in From an Outside Line]

By interchanging the processes executed in the handset 1 and base unit 2, described above, it is possible for the base unit 2 to be connected to the handset 1 when there is any call-in even if the handset 1 is situated within the reachable area of the radio wave of the base unit of another cordless telephone.

[Others]

A processing similar to the above is also to be performed when the base unit 2 has a transmitter and a receiver and the handset 1 and the base unit 2 are connected together by calling one from the other of them in order to effect inside line communication.

In accordance with this invention, connection from the handset 1 (or the base unit 2) is possible even when the base unit 2 (or the handset 1) is within the reachable area of the radio wave of the handset (or the base unit) of another cordless telephone that is being used.

What is claimed is:

1. A method of communication between a first communication unit and a second communication unit using a pair of communication channels selected from a plurality of pairs of communication channels, said method comprising:

step (a) at said first communication unit:
        detecting as a first channel an available channel of a pair of communication channels, and
        transmitting a channel connection request signal over a second channel of said pair of communication channels to said second communication unit;

step (b) at said second communication unit:
        receiving said channel connection request signal,
        determining whether said second channel of said pair of communication channels is available or busy, and
        transmitting a resultant signal over said first channel of said pair o: communication channels to said first communication unit, wherein said resultant signal contains ACK data if said second channel of said pair of communication channels is determined to be available, and is a burst type signal containing NGACK data if said second channel of said pair of communication channels is determined to be busy;

step (c) at said first communication unit:
        receiving said resultant signal;

step (d) if said resultant signal indicates that said second channel of said pair of communication channels is available, using said pair of communication channels for communication between said first and second communication units;

step (e) if said resultant signal indicates that said second channel of said pair of communication channels is not available, repeating steps (a), (b), and (c) with respect to another pair of said plurality of pairs of communication channels until said resultant signal from said second communication unit indicates that a second channel of said another pair of communication channels is available; and step (f) if said resultant signal indicates that said second channel of said another pair of communication channels is available, using said another pair of communication channels for communication between said first and second communication units.

2. The method according to claim 1, wherein steps performed at said first communication unit are performed using a handset of a cordless telephone system and steps performed at said second communication unit are performed at a base unit for a cordless telephone system.

3. The method according to claim 1, wherein steps performed at said first communication unit are performed at a base unit for a cordless telephone system and steps performed at said second communication unit are performed using a handset of a cordless telephone system.

4. A communication system for communication between a pair of communication channels selected from a plurality of pairs of communication channels, said communication system comprising:

a first communication unit including:
        means for detecting as a first channel an available channel of said pair of communication channels, and
        means for transmitting a channel connection request signal over a second channel of said pair of communication channels;

a second communication unit including:
        means for receiving said channel connection request signal,
        means for determining whether said second channel of said pair of communication channels is available or busy, and
        means for transmitting a resultant signal over said first channel of said pair of communication channels to said first communication unit; and means for designating for communication between said first and second communication units said pair of communication channels if said resultant signal indicates that said second channel of said pair of communication channels is available, wherein said resultant signal contains ACK data if said second channel of said pair of communication channels is determined to be available, and is a burst type signal containing NGACK data if said second channel of said pair of communication channels is determined to be busy.

5. The communication system according to claim 4, wherein said first communication unit comprises a handset of a cordless telephone system and said second communication unit comprises a base unit for a cordless telephone system.

6. The communication system according to claim 4, wherein said first communication unit comprises a base unit for a cordless telephone system and said second communication unit comprises a handset of a cordless telephone system.

* * * * *